United States Patent
Ishizuki et al.

(10) Patent No.: US 8,863,614 B2
(45) Date of Patent: Oct. 21, 2014

(54) MEMBER INTEGRATED WITH SLEEVE, AND METHOD FOR MANUFACTURING SAME

(75) Inventors: Masaharu Ishizuki, Yokohama (JP); Hiroshi Kimura, Yokohama (JP); Chitoshi Ogata, Yokohama (JP); Akira Ishiyama, Yokohama (JP)

(73) Assignee: Yorozu Corporation, Kanagawa (JP)

( * ) Notice: Subject to any disclaimer, the term of this patent is extended or adjusted under 35 U.S.C. 154(b) by 0 days.

(21) Appl. No.: 13/575,514

(22) PCT Filed: Jan. 26, 2011

(86) PCT No.: PCT/JP2011/051509
§ 371 (c)(1),
(2), (4) Date: Sep. 11, 2012

(87) PCT Pub. No.: WO2011/093345
PCT Pub. Date: Aug. 4, 2011

(65) Prior Publication Data
US 2012/0325990 A1     Dec. 27, 2012

(30) Foreign Application Priority Data

Jan. 27, 2010   (JP) ................................. 2010-015658

(51) Int. Cl.
*G05G 1/48*     (2008.04)
*B60T 7/06*     (2006.01)
*G05G 1/30*     (2008.04)
*B21D 35/00*    (2006.01)
*B21D 53/88*    (2006.01)

(52) U.S. Cl.
CPC ... *B60T 7/06* (2013.01); *G05G 1/30* (2013.01); *B21D 35/001* (2013.01); *B21D 53/88* (2013.01)
USPC ............................................. 74/563; 74/560

(58) Field of Classification Search
USPC ................. 248/205.1; 74/512, 560, 513, 563; 184/274, 275
See application file for complete search history.

(56) References Cited

U.S. PATENT DOCUMENTS 6,158,266 A * 12/2000 Elipe et al. ................... 72/379.2
6,408,711 B1 * 6/2002 Mizuma et al. ................. 74/512

(Continued)

FOREIGN PATENT DOCUMENTS

JP    A-1-242809    9/1989
JP    U-5-12335     2/1993

(Continued)

*Primary Examiner* — Todd M Epps
(74) *Attorney, Agent, or Firm* — Drinker Biddle & Reath LLP (57) ABSTRACT

The invention is characterized in that, when protrusion parts 30 are raised from a substrate W and the protrusion parts 30 are formed into spacers 12 with a predetermined outer diameter D and height H, the protrusion parts 30 are temporarily formed so as to have a diameter larger than a predetermined outer diameter D and a height larger than a predetermined height H, and the protrusion parts 30 are crushed, and leading end portions 30b of the protrusion parts 30 are protruded in a radially outward direction so as to have a double-layered structure, and then through-holes 35 are opened at the leading end portions 30b. Accordingly, the leading end portions 30b have strength due to a double-layered structure, and side portions 30a also have high strength due to contraction by pressing, whereby the sleeve-integrated member includes the entirely high-strength spacers 12.

3 Claims, 8 Drawing Sheets (56) References Cited

U.S. PATENT DOCUMENTS

| | | | |
|---|---|---|---|
| 6,622,592 B2 * | 9/2003 | Lee | 74/563 |
| 8,656,805 B2 * | 2/2014 | Palacio Arguelles et al. | 74/563 |
| 2004/0144199 A1 * | 7/2004 | Kanbe et al. | 74/563 |
| 2012/0318098 A1 * | 12/2012 | Bruno | 74/563 |

FOREIGN PATENT DOCUMENTS

| | | |
|---|---|---|
| JP | A-11-254049 | 9/1999 |
| JP | 2006297455 A | 11/2006 |
| JP | A-2006-297455 | 11/2006 |
| WO | WO-2008000986 A1 | 1/2008 |

* cited by examiner

MEMBER INTEGRATED WITH SLEEVE, AND METHOD FOR MANUFACTURING SAME

CROSS-REFERENCE TO RELATED APPLICATIONS

This application is a national stage application (under 35 U.S.C. §371) of PCT/JP2011/051509 filed Jan. 26, 2011, which claims the benefit of Japanese Application No. 2010-015658, filed Jan. 27, 2010.

BACKGROUND OF THE INVENTION

1. Technical Field

The invention relates to a sleeve-integrated member for use in attaching a brake pedal device to a dash panel, for example, and a method for manufacturing the same.

2. Background Art

With regard to a vehicle brake pedal device, for example, a unit body holding a base end side of a brake pedal is attached to a dash panel via an end plate, as described in Japanese Utility Model Application Laid-Open (JP-U) Publication No. 5-12335. The dash panel, which is intended to separate a vehicle interior and an engine room, is formed by a high-strength plate material and thus can sufficiently counteract a great force that may act at application of a brake.

However, there is the need to provide a space between the unit main body and the dash panel so that a sound insulator or the like may be placed there. Therefore, when the brake pedal device is attached to the dash panel, a spacer is provided between the end plate of the unit main body and the dash panel. In addition, the brake pedal device is attached by inserting a bolt from the dash panel, passing the bolt through a sleeve, and then screwing the bolt with a nut on the substrate side.

Nevertheless, if the spacer and the endplate are separate parts, bolt insertion becomes a troublesome task and thus a large amount of time is required at a step of attaching a brake pedal in an automobile manufacturing line. Therefore, a spacer is generally integrated in advance into an endplate.

However, a conventional method for manufacturing a member with a spacer (hereinafter, referred to as a sleeve) integrated in advance into an endplate (hereinafter, referred to as a substrate) (hereinafter, referred to as a sleeve-integrated member) includes attaching a short cylindrical sleeve to the substrate by welding, which is poor in workability and also disadvantageous in terms of costs. Especially, workability may be more decreased in the case of attaching a plurality of sleeves. If forming the sleeve by pressing, the sleeve-integrated member can be manufactured more easily with improved workability as compared to the case of welding, but there is a possibility that the leading end of the sleeve raised by the substrate at drawing formation becomes prone to be made thin-walled and insufficient in strength or rigidity. In particular, if a heavy load acts on a sleeve in a sleeve-integrated member for attachment of a brake pedal device and the like, the sleeve needs to have sufficient strength and rigidity as a whole. However, the current sleeve-integrated member does not meet the need.

SUMMARY OF INVENTION

Technical Problem

The invention is devised to solve the foregoing problem with the related art. An object of the invention is to provide a sleeve-integrated member in which a sleeve raised from a substrate has rigidity not only at a leading end but also over the whole thereof, and a method for manufacturing the same in an easy manner.

A sleeve-integrated member for a brake pedal device according to the invention to attain the foregoing object, includes: a housing provided such that a vehicle operation pedal swings around a holding shaft; and a plurality of sleeves with a predetermined outer diameter and height, as spacers to create space between the housing and a dash panel to which the housing is attached, around through-holes opened at a substrate of the housing. According to an aspect of the present invention, each of the sleeves has: a waist part integrally formed on the substrate from a base portion to a leading end by drawing formation of the substrate; and a leading end flange portion with at least a double-layered structure formed at a leading end portion of the waist part so as to have a wall thickness larger than a plate thickness of the substrate. And, a bolt is inserted into a through-hole formed so as to have an axis line orthogonal to a planar surface of the substrate from the base portion to the leading end flange portion of the waist part, thereby the substrate is tightened and fixed to the dash panel while a leading end of the leading end flange portion is in contact with the dash panel.

A manufacturing method according to the invention to attain the foregoing object is a method for manufacturing a sleeve-integrated member for a brake pedal device includes: a housing provided such that a vehicle operation pedal swings around a holding shaft; and a plurality of sleeves with a predetermined outer diameter and height, as spacers to create space between the housing and a dash panel to which the housing is attached, around through-holes opened at a substrate of the housing, the substrate being tightened and fixed by a bolt to the dash panel while a leading end of the sleeve is in contact with the dash panel. According to another aspect of the present invention, the method includes: a drawing step for forming a protrusion part raised so as to have an axis line orthogonal to a planar surface of the substrate before opening of the through-holes, such that the protrusion part has a diameter larger than the outer diameter and a height larger than the predetermined height; a crushing step for crushing the protrusion part formed at the drawing step to the predetermined height and protruding a leading end portion of the protrusion part in a radially outward direction to form an outer edge of the leading end portion so as to have at least a double-layered structure; and a piercing step for opening a through-hole at the leading end portion to form the leading end flange portion.

According to the sleeve-integrated member of the invention, the leading end flange portion of the sleeve has at least a double-layered structure, which allows the sleeve to have rigidity and strength with the reinforced leading end thereof. In addition, when the sleeve is formed by pressing the substrate, a flow line of material from the substrate to the entire sleeve becomes continuous, the substrate and the sleeve can be unified in rigidity and strength, whereby the entire member can be provided with desired rigidity and strength.

According to a second aspect of the invention, a plurality of sleeves is formed on the substrate, thereby achieving further improved workability.

According to a method for manufacturing a sleeve-integrated member of the invention, when a protrusion part is raised from the substrate to form a sleeve with predetermined outer diameter and height, the sleeve is temporarily formed with a larger diameter than the predetermined outer diameter and a larger height than the predetermined height, and then the protrusion part of the sleeve is crushed and the leading end portion of the same is protruded in the radially outward direction to set the leading end portion as the leading end flange portion with at least a double-layered structure, a through-hole is opened at the leading end portion to form the leading end flange portion. Accordingly, the sleeve has the leading end portion with a multi-layered structure with increased strength, and has side portions with high strength due to increase of wall thickness due to crushing. This realizes the sleeve with strength and rigidity as a whole. In addition, the sleeve-integrated member can be manufactured in an excessively easy manner because the entire body is formed only by pressing.

According to a fourth aspect of the invention, the drawing step includes a first drawing step for forming the protrusion part on the substrate so as to have a larger diameter than the predetermined outer diameter and have a height similar to the predetermined height; and a second drawing step for forming the protrusion part formed at the first drawing step so as to decrease an outer diameter of the protrusion part and have a height larger than the predetermined height. Accordingly, the protrusion part can be made further higher, which allows subsequent formation of the leading end flange portion in an excessively smooth and easy manner.

Further, the manufacturing method of the invention has a formation finishing step for forming the protrusion part formed at the second drawing step so as to further decrease the outer diameter of the protrusion part and have a further larger height, which further facilitates formation of the leading end flange portion with a multi-layered structure.

DESCRIPTION OF EMBODIMENTS

An embodiment of the invention will be described below with reference to the drawings.

Figure 1:
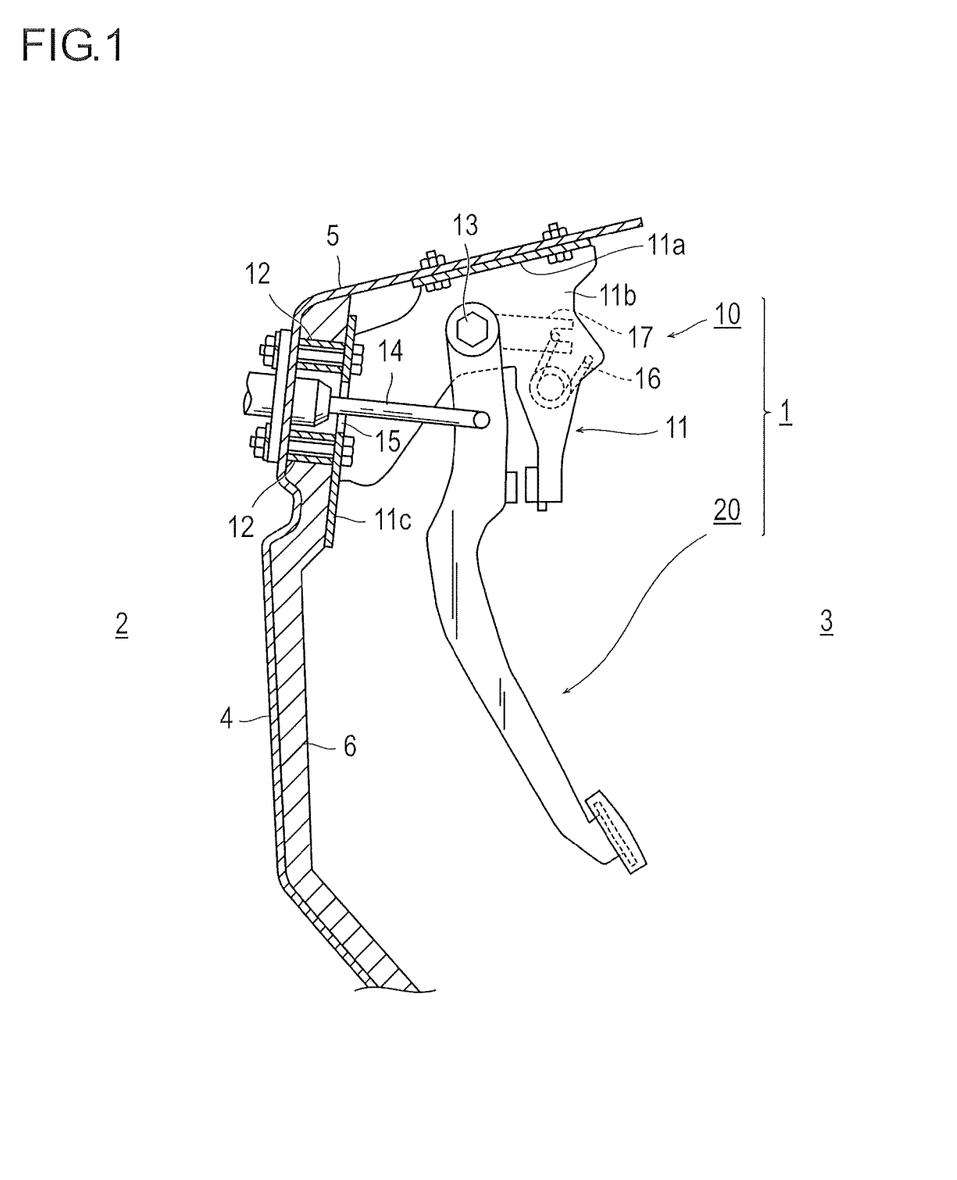
FIG. 1 is a schematic cross-section view of an attached state of a sleeve-integrated member of the invention.

A usage example of a sleeve-integrated member according to the embodiment is a vehicle brake pedal device as shown in FIG. 1, for example. A brake pedal device 1 has a unit main body 10 and a brake pedal 20 for a passenger to perform a braking operation.

The unit main body 10 is attached to a dash lower panel 4 separating an engine room 2 from a vehicle interior 3 and to a dash upper panel 5 provided on the dash lower panel 4 and constituting a portion of a cowl part. Specifically, the unit main body 10 has a housing 11 formed by an apical plate 11a attached by bolts to the dash upper panel 5, side plates 11b drooping from both side ends of the apical plate 11a along a vehicle width direction, and an end plate (basal plate) 11c drooping on the front of the apical plate 11a. The unit main body 10 is held by the apical plate 11a and the end plate 11c.

When the end plate 11c is attached by bolts to the dash lower panel 4, and four spacers (sleeves) 12 are integrally provided on the dash lower panel 4 to create spaces for placement of sound insulators 6 or the like between the dash lower panel 4 and the end plate 11c. The spacers 12 are subjected to not only weight of the brake pedal device 1 but also an operational force at application of a brake and a tightening force at tightening of the bolts. Accordingly, the spacers 12 need to have strength and rigidity enough to counteract these forces and be less prone to be deflected. Therefore, the spacers 12 are each configured such that a waist part 12a has a through-hole with an axis line orthogonal to a planar surface of the end plate 11c, and the end plate 11c has a predetermined wall thickness t. In addition, the spacers 12 are each formed so as to have a predetermined height H from the end plate 11c to a leading end of the spacer 12.

Figure 3:
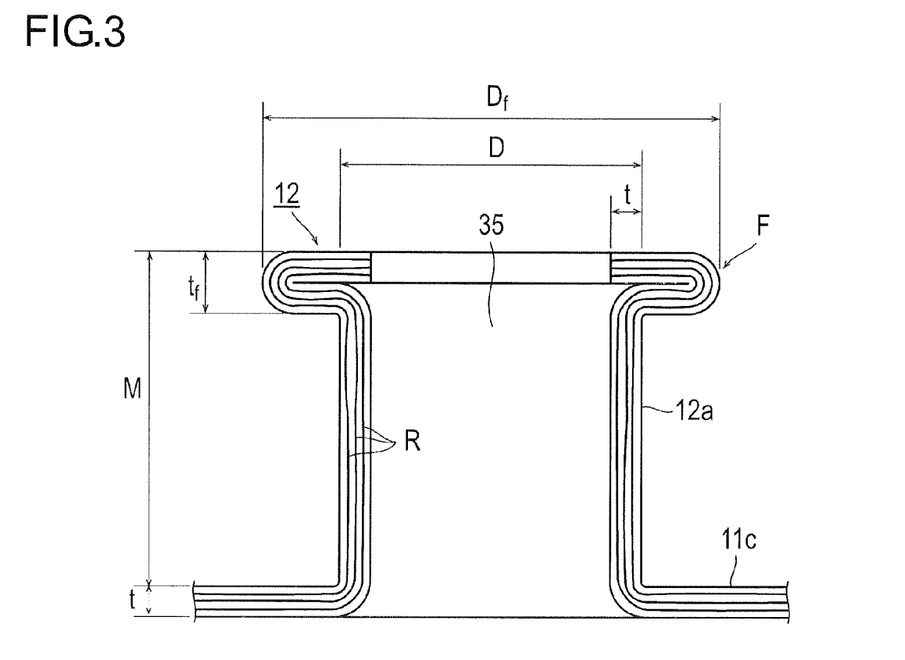
FIG. 3 is a diagram showing a flow line of material at a cross section taken along the line 3-3 of FIG. 2.

In particular, leading end flange portions F formed at the leading ends of the spacers 12 are each configured to have a wall thickness tf larger than the wall thickness t and an outer diameter Df larger than an outer diameter D of the spacers 12. In addition, in the embodiment, the sleeve-integrated member is formed by pressing as shown in FIG. 3, a material flow line R from the end plate 11c to the leading end flange portions F of the spacers 12 is made continuous. As a result, it is possible to unify the end plate 11c and the spacers 12 in rigidity and strength, whereby the entire member can have desired rigidity and strength.

The unit main body 10 has a holding shaft 13 provided so as to be capable of turning between the side plates 11b, and an upper end portion of the brake pedal 20 is coupled to the holding shaft 13 so that the brake pedal 20 swings around the holding shaft 13 by a passenger's treading operation. Since the brake pedal 20 is coupled to the holding shaft 13 via a master back (not shown) and a push rod 14 for applying a brake with an increased force of a braking operation, the endplate 11c has at a center thereof a through-hole 15 into which the push rod 14 is to be inserted.

Reference numeral "16" denotes a return spring for returning the treaded brake pedal 20 to the original position (position shown in the drawing) and "17" denotes a bracket.

A method for forming the thus configured sleeve-integrated member will be described.

<Formation of the Substrate>

Figure 2:
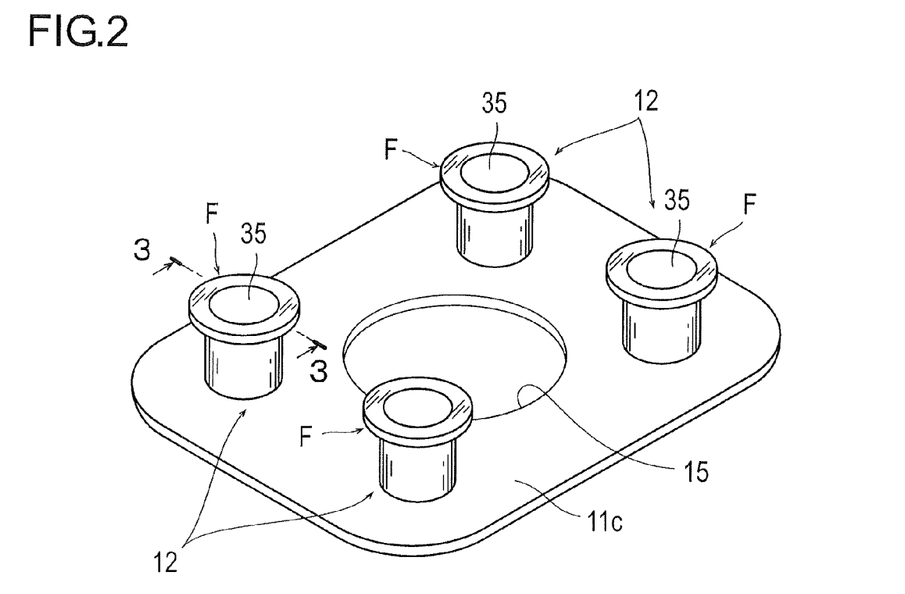
FIG. 2 is a schematic perspective view of the sleeve-integrated member.
Figure 4A:
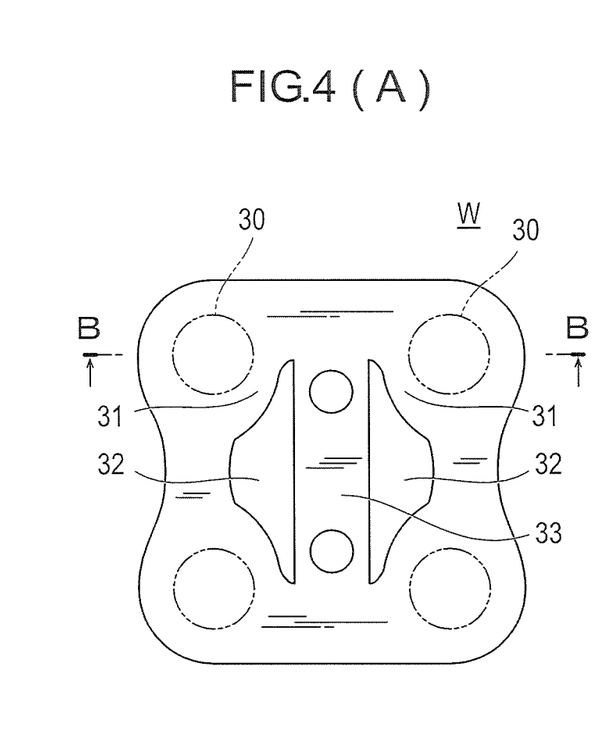
FIG. 4A is a plan view of a plate material for formation of the sleeve-integrated member.
Figure 4B:
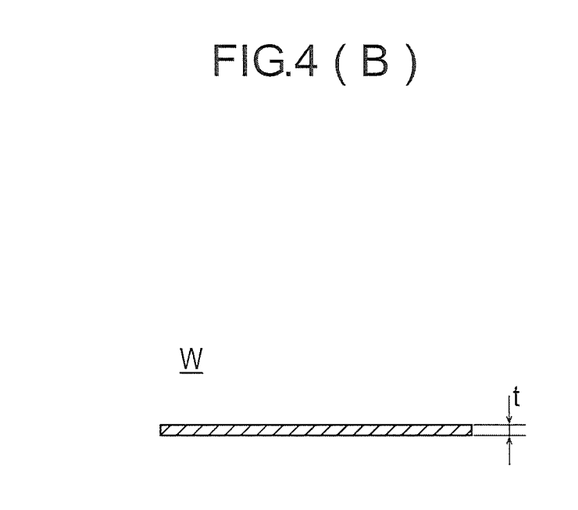
FIG. 4B is a schematic cross-section view taken along the line B-B of FIG. 4A.

First, as shown in FIG. 4, an approximately rectangular substrate W for the endplate 11c is punched out from a blank material with the predetermined wall thickness t. Formed near corners of the substrate W are cylindrical protrusion parts 30 (shown by imaginary lines) as original parts for the spacers 12 with the predetermined outer diameter D and height H (see FIG. 3). To move a material evenly at the formation, it is preferred to make corners of the substrate W arc-shaped, and punch out through-holes 32 so as to make inner regions 31 of the protrusion parts 30 also arc-shaped. The substrate W has a central portion to be removed later to thereby open a through-hole 15 (see FIG. 2) for insertion of the push rod 14. However, for preventing deformation of the substrate W at the formation of the protrusion parts 30, the through-holes 32 are preferably formed such that there exists a support member 33 coupling both end portions of the substrate W.

<First Drawing Step>

Figure 5A:
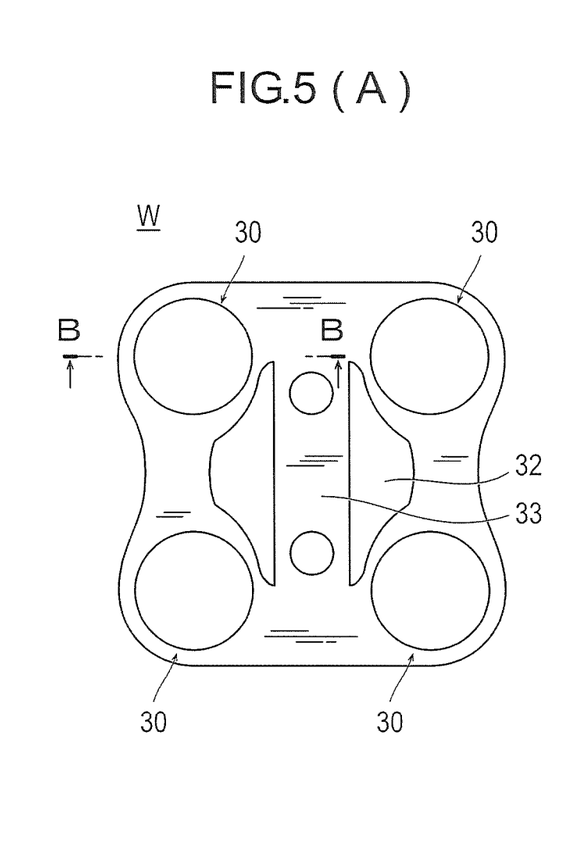
FIG. 5A is a plan view of formation state of the sleeve-integrated member at a first drawing step.
Figure 5B:
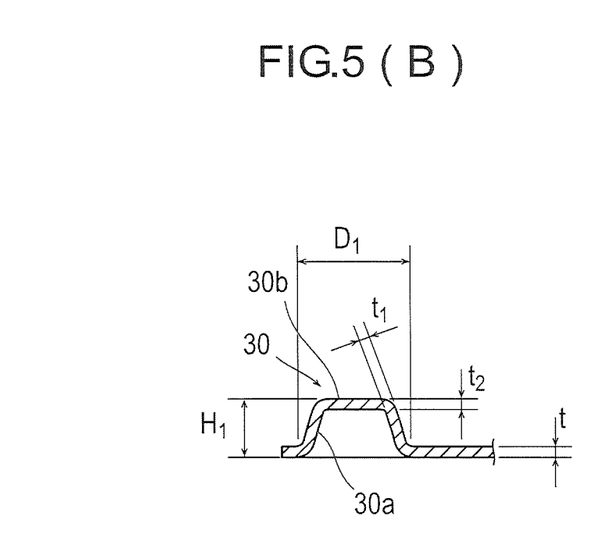
FIG. 5B is a schematic cross-section view taken along the line B-B of FIG. 5A.

Next, a first drawing formation is performed to form the protrusion parts 30 in corner regions of the substrate W. The protrusion parts 30 have an outer diameter D1 larger than the outer diameter D of the spacers 12, as shown in FIG. 5, and have a height H1 similar to the height H of the spacers 12, from the substrate W to the leading end portions 30b. By forming the protrusion part 30 larger than the spacers 12, subsequent formation steps is turned into reducing material, thereby that facilitates the formation, and it is preferable.

This formation is performed by setting the substrate W on a receiving mold and pressurizing the substrate W by a punching mold, as in general formation methods. However, to avoid wrinkles or breakage on the substrate W, a bead or the like is preferably provided on the receiving mold to control a flow of material.

At the drawing formation, a plate material enters into a concave part or hole part of the receiving mold from the circumference. In the embodiment, the angular portions of the substrate W and the portions for the inner regions 31 of the protrusion parts 30 are both formed in the arc shape, whereby the material evenly enters into the receiving mold on outer peripheries of the protrusion parts 30, and a wall thickness t2 of the leading end portions 30b of the protrusion parts 30 is decreased as compared to the initial wall thickness t. The wall thickness t1 of the side portions 30a of the protrusion parts 30 does not change significantly.

<Second Drawing Step>

Figure 6A:
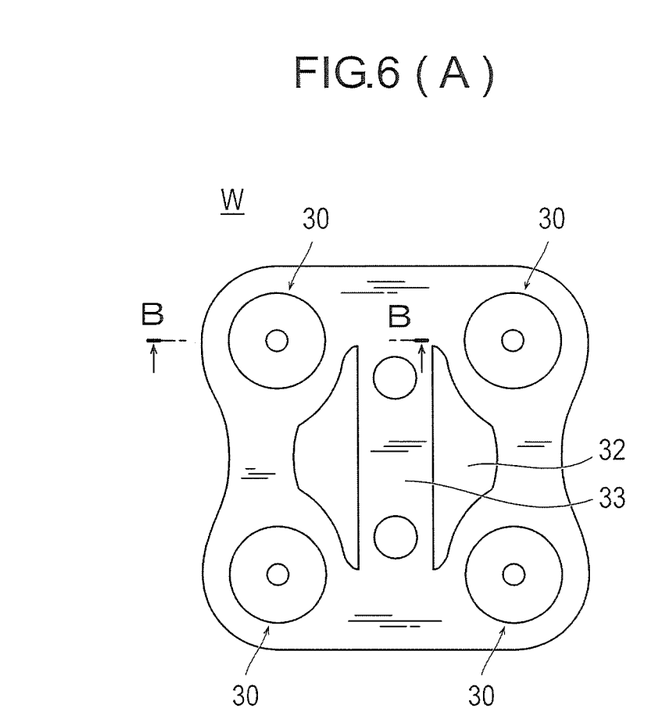
FIG. 6A is a plan view of formation state of the sleeve-integrated member at a second drawing step.
Figure 6B:
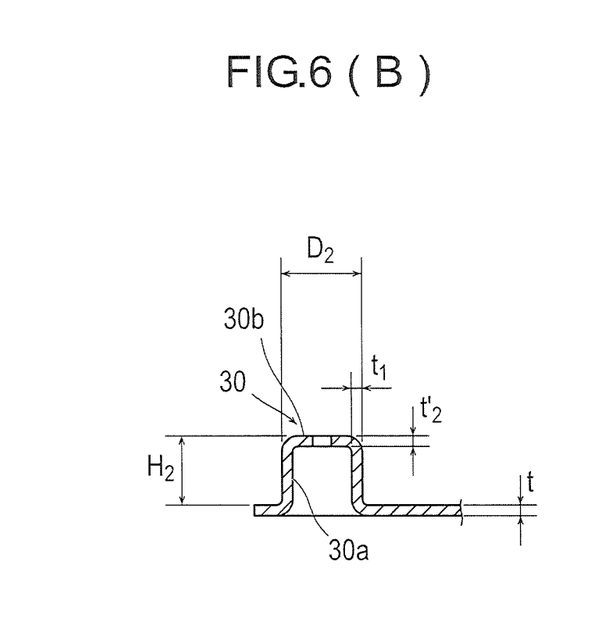
FIG. 6B is a schematic cross-section view taken along the line B-B of FIG. 6A.

Next, as shown in FIG. 6, a second drawing formation is performed to make a height H2 of the protrusion parts 30 larger than the height H1 at the first draw formation and make an outer diameter D2 of the protrusion parts 30 smaller than the outer diameter D1 at the first draw formation. The receiving mold and the punching mold at the second drawing formation are different from those at the first drawing formation, and a hole inner diameter of the receiving mold and an outer diameter of the punching mold are smaller than those at the first drawing formation. At the second drawing formation, the outer diameter is narrowed and thus an excess material in the radial direction can be used for height increase. As a result, a wall thickness t2' of the leading end portions 30b of the protrusion parts 30 formed at the second drawing formation is decreased somewhat, but the thickness t1 of the side portions 30a is not decreased.

<Finishing Formation Step>

Figure 7A:
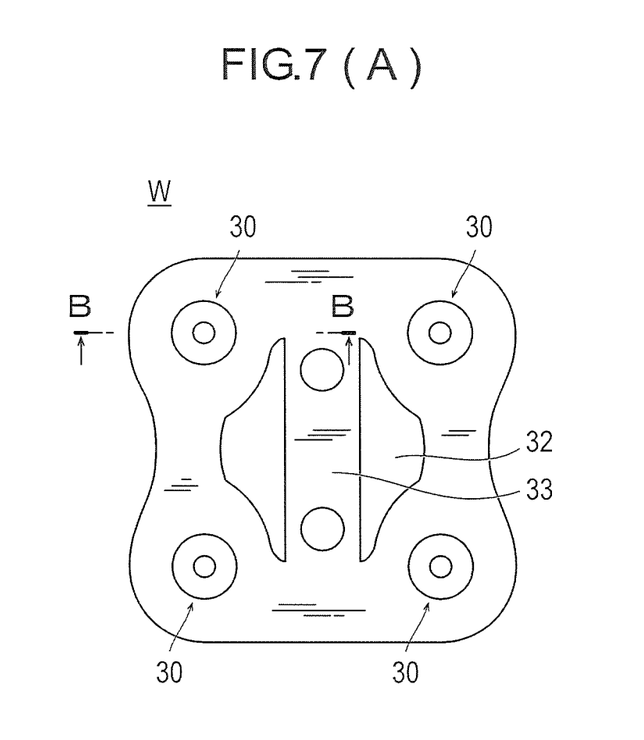
FIG. 7A is a plan view of formation state of the sleeve-integrated member at a formation finishing step.
Figure 7B:
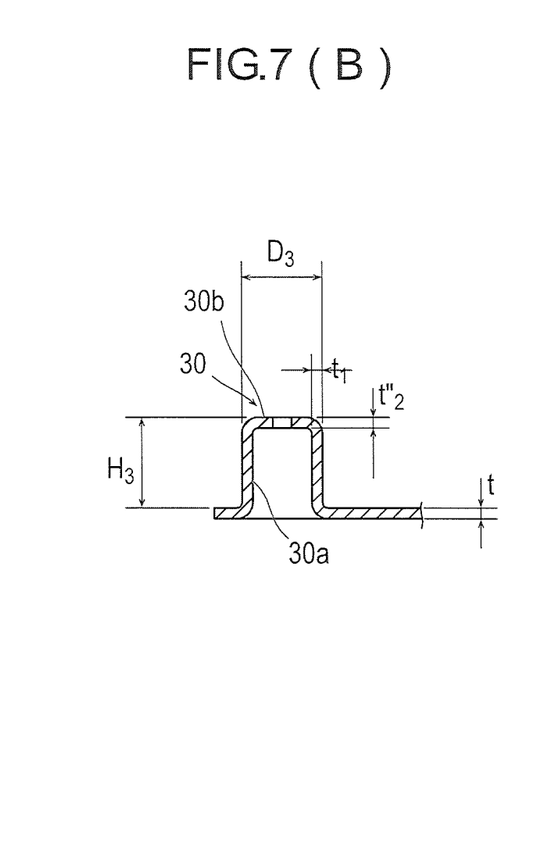
FIG. 7B is a schematic cross-section view taken along the line B-B of FIG. 7A.

The protrusion parts 30 formed at the second drawing formation, if they are insufficient in height, are further restruck for finishing formation. In other words, as shown in FIG. 7, the protrusion parts 30 are finished so as to have a height H3 larger than the height H2 at the second drawing formation and an outer diameter D3 smaller than the outer diameter D2 at the second drawing formation. The finishing formation provides the desired protrusion parts 30 so as to have a desired wall thickness, that is, a wall thickness at least equal to or more than the initial wall thickness t when the leading end flange portions F described later have a double-layered structure. A receiving mold and a punching mold for the finishing formation are larger in depth or protrusion height than those at the second drawing formation, and are smaller in hole inner diameter and outer diameter than those at the second drawing formation.

In addition, the finishing formation may not necessarily be performed if the desired protrusion parts 30 can be obtained by the second drawing formation.

<Crushing Step>

Figure 8A:
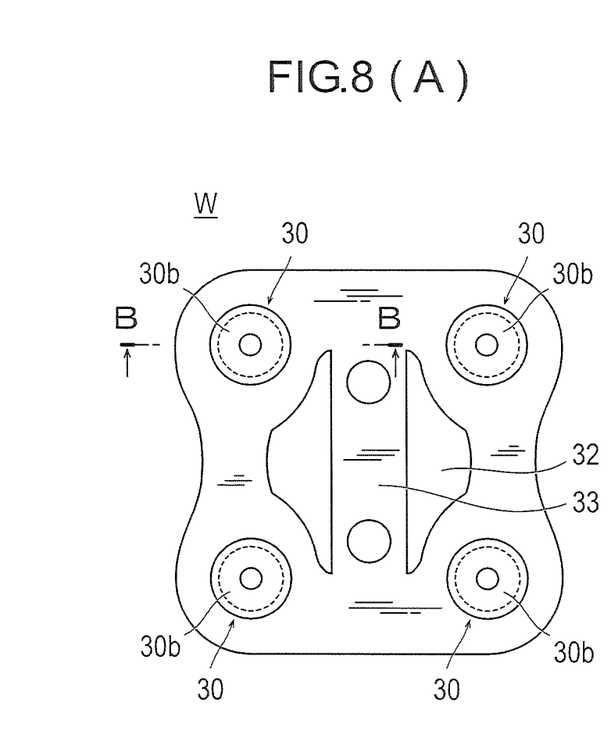
FIG. 8A is a plan view of formation state of the sleeve-integrated member at a crushing step.
Figure 8B:
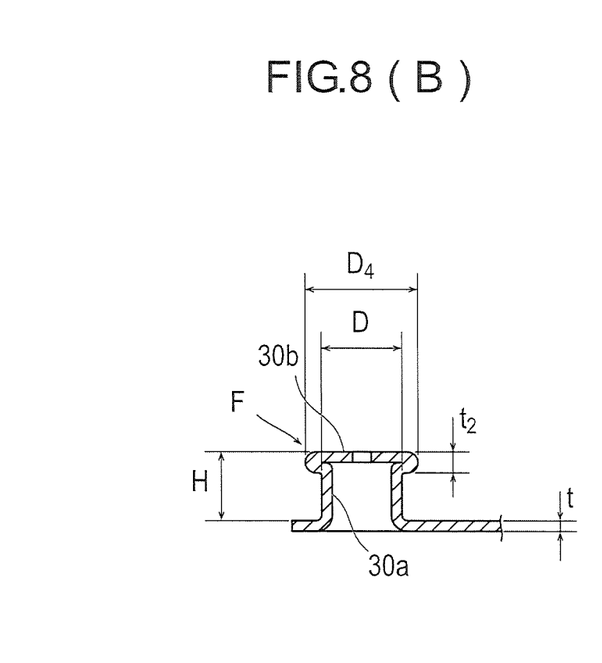
FIG. 8B is a schematic cross-section view taken along the line B-B of FIG. 8A.

Next, a crushing step is performed. At the crushing step, as shown in FIG. 8, the leading end portions 30b of the protrusion parts 30 formed at the second drawing formation or the finishing formation are crushed such that the protrusion parts 30 have the desired height H and outer diameter D, and the leading end portions 30b are protruded in a radially outward direction to form the leading end flange portions F. In other words, a receiving mold and a punching mold smaller in depth or protrusion height and larger in hole inner diameter and outer diameter than the receiving mold and the punching mold used at the second drawing formation or the finishing formation, are used to crush the leading end portions 30b of the protrusion parts 30 in an axial direction so as to have a largest outer diameter D4, and form portions of outer peripheral regions of the leading end parts 30b so as to have a double-layered structure. As a result, even if a wall thickness t2" of the leading end parts 30b becomes smaller somewhat at the second drawing formation or the finishing formation, the leading end parts 30b each have a double-layered wall and thus the leading end flange portions F have sufficient thickness and strength.

<Piercing Step>

Subsequently, a piercing step is performed to open through-holes 35 for bolt insertion at centers of the double-layered leading end portions 30b in the protrusion part 30, that is, at single-layered portions.

<Final Step>

Figure 9A:
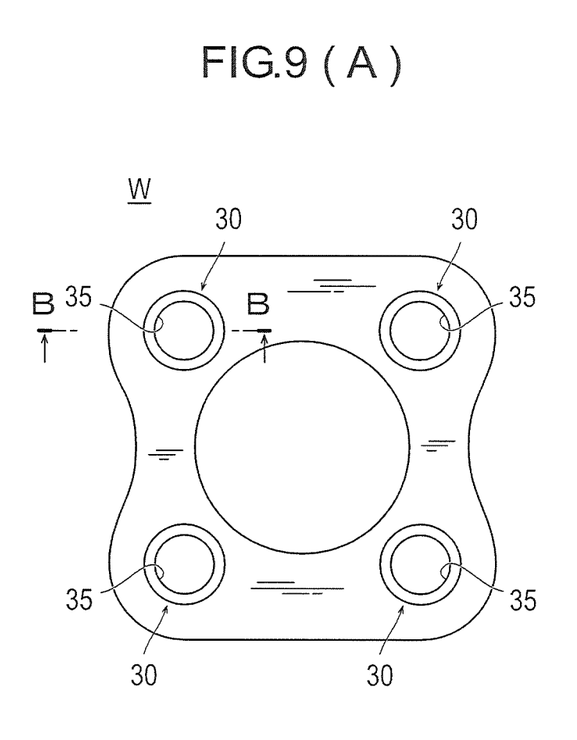
FIG. 9A is a plan view of formation state of the sleeve-integrated member at a piercing step.
Figure 9B:
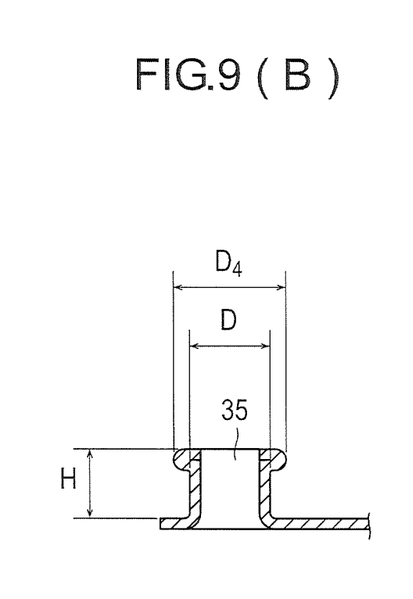
FIG. 9B is a schematic cross-section view taken along the line B-B of FIG. 9A.

Finally, as shown in FIG. 9, the central portion of the substrate W is punched out to open the through-hole 15 into which the push rod 14 is to be inserted.

Example

The foregoing manufacturing method was verified. The spacers 12 with the outer diameter D of 16.0 mm and the height H of 10.7 mm were formed using, as a plate material, a structural rolled steel plate with the plate thickness t of 1.4 mm.

At the first drawing formation, the substrate W was formed with the protrusion parts 30 having the outer diameter D1 of 27 mm and the height H1 of 12 mm, at four corners thereof.

Next, the second drawing formation was performed to form the protrusion parts 30 having the outer diameter D2 of 19.4 mm and the height H2 of 15 mm. At the second drawing formation, the protrusion parts 30 could be smoothly formed without any wrinkle or breakage on the substrate W.

Then, the finishing formation was performed to form the protrusion parts 30 having the outer diameter D3 of 15.5 mm smaller than the outer diameter D2 and the height H3 of 16.0 mm larger than the height H2.

The protrusion parts 30 were crushed so as to have the height H of 10.7 mm and the outer diameter D of 18.0 mm and have the leading end portions 30b with a double-layered structure. The plate thickness t1 of the side portions 30a of the protrusion parts 30 is 1.5 mm with a difference of 0.1 mm from the initial plate thickness. The plate thickness t2 of the leading end portions 30b with a double-layered structure is 2.0 mm, which is larger than the initial plate thickness. Then, the piercing step was performed on the leading end portions 30b of the protrusion parts 30 to open the through-holes 35 of 13 mm.

The M8 bolts were inserted into the spacers 12 of the sleeve-integrated member, and were screwed together with the nuts to tighten the end plate 11c. The tightening did not break the spacers 12 or cause any practical problem.

The invention is not limited to only the foregoing embodiment but can be modified by a person skilled in the art in various manners within the scope of the technical idea of the invention. For example, the foregoing embodiment includes the end plate used in a vehicle brake pedal device, but the invention is not limited to the embodiment and can be applied to structures using a wide variety of sleeve-shaped members such as a collar attached to a suspension device.

In addition, the foregoing embodiment includes the leading end portions 30b with a double-layered structure, but the leading end portions 30b may have a three-layered or more multi-layered structure.

INDUSTRIAL APPLICABILITY

The invention can be favorably applied to an end plate or the like for use at attachment of a vehicle brake pedal device to a dash panel, for example.
Finally, the subject application is based on Japanese Patent Application No. 2010-15658 filed on Jan. 27, 2010, and the disclosure thereof is referenced and incorporated herein as a whole.

The invention claimed is:

1. A sleeve-integrated member for a brake pedal device, comprising:
　a housing provided such that a vehicle operation pedal swings around a holding shaft; and
　a plurality of sleeves with a predetermined outer diameter and height, as spacers to create space between the housing and a dash panel to which the housing is attached, around through-holes opened at a substrate of the housing, wherein each of the sleeves has:
　a waist part integrally formed on the substrate from a base portion to a leading end by a drawing formation of the substrate; and
　a leading end flange portion with at least a double-layered structure formed at a leading end portion of the waist part, wherein a bolt is inserted into a through-hole formed so as to have an axis line orthogonal to a planar surface of the substrate from the base portion to the leading end flange portion of the waist part, thereby to tighten and fix the substrate to the dash panel while a leading end of the leading end flange portion is in contact with the dash panel.

2. A method for manufacturing a sleeve-integrated member for a brake pedal device including a housing provided such that a vehicle operation pedal swings around a holding shaft; and a plurality of sleeves with a predetermined outer diameter and height, as spacers to create space between the housing and a dash panel to which the housing is attached, around through-holes opened at a substrate of the housing, the substrate being tightened and fixed by a bolt to the dash panel while a leading end of the sleeve is in contact with the dash panel, wherein the method comprises:
　a drawing step for forming a protrusion part raised so as to have an axis line orthogonal to a planar surface of the substrate before opening of the through-holes, such that the protrusion part has a diameter larger than the outer diameter and a height larger than the predetermined height;
　a crushing step for crushing the protrusion part formed at the drawing step to the predetermined height and protruding a leading end portion of the protrusion part in a radially outward direction to form an outer edge of the leading end portion as a leading end flange portion having at least a double-layered structure; and
　a piercing step for opening a through-hole at the leading end portion.

3. The method for manufacturing a sleeve-integrated member according to claim 2, wherein the drawing step includes: a first drawing step for forming the protrusion part on the substrate so as to have a larger diameter than the predetermined outer diameter and have a height similar to the predetermined height; and a second drawing step for forming the protrusion part formed at the first drawing step so as to be decreased in outer diameter and have a height larger than the predetermined height; and a formation finishing step for forming the protrusion part formed at the second drawing step so as to be further decreased in outer diameter and have a further larger height than the height.

* * * * *